United States Patent [19]
Kalman et al.

[11] Patent Number: 5,239,250
[45] Date of Patent: Aug. 24, 1993

[54] CAPACITOR-ASSISTED LINE COMMUTATION FOR INDUCTION MOTOR DRIVES

[75] Inventors: Gabor Kalman, Palos Verdes; Colin E. Huggett, Torrance, both of Calif.

[73] Assignee: Allied-Signal Inc., Morris Township, N.J.

[21] Appl. No.: 520,093

[22] Filed: Aug. 4, 1983

[51] Int. Cl.⁵ .......................................... H02P 5/168
[52] U.S. Cl. ............................................... 318/729
[58] Field of Search ............... 318/729; 323/205, 207, 323/208

[56] References Cited

U.S. PATENT DOCUMENTS

| | | | |
|---|---|---|---|
| 3,555,396 | 1/1971 | Kalman | 323/207 |
| 4,001,670 | 1/1977 | Gyugyi et al. | 323/207 |
| 4,013,937 | 3/1977 | Pelly et al. | 323/207 |
| 4,039,926 | 8/1977 | Steigerwald | 363/138 |
| 4,158,801 | 6/1979 | Hirata | 318/809 |
| 4,249,120 | 2/1981 | Earle | 318/729 |
| 4,330,741 | 5/1982 | Nagase et al. | 318/809 |

FOREIGN PATENT DOCUMENTS 2085204  4/1982  United Kingdom ............... 323/205

OTHER PUBLICATIONS

Laithwaite et al, "Development of an Induction Machine Commutated Thyristor Inverter for Traction Drives" Conference IAS Annual Meeting 1980, CIncinnati, Ohio. (Sep. 28–Oct. 30, 1980) pp. 580–585.

Murphy, J. M. D., *Thristor Control of AC Motors*, Pergamon Press, 1973, pp. 30–31.

Thorboro, K., "A Three Phase Inverter with a Reactive Power Control", IEEE International Semiconductor Power Convertor Conference (Cl.323-210) Baltimore, Md. May 8–10, 1972.

*Primary Examiner*—William M. Shoop, Jr.
*Attorney, Agent, or Firm*—Leslie S. Miller; James W. McFarland; Robert A. Walsh

[57] ABSTRACT

A variable speed drive system for an induction motor is disclosed which utilizes power factor correction capacitors to allow an induction motor to be driven by a line-commutated inverter using variable phase angle triggering of the thyristors in the inverter to compensate for frequency-induced changes in the operating point of the system.

22 Claims, 4 Drawing Sheets

Fig. 1.
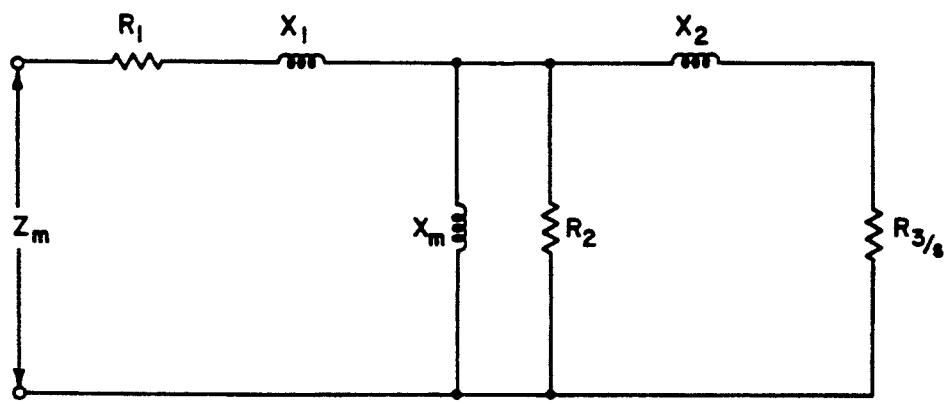
Fig. 2.
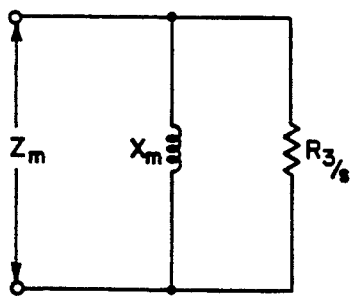
Fig. 3.
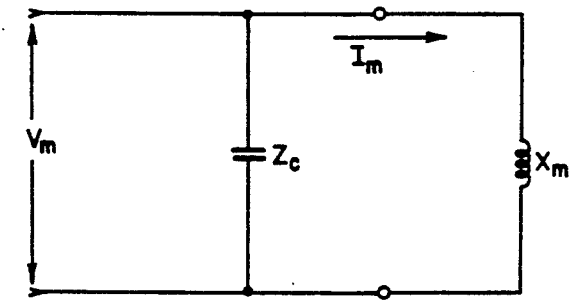
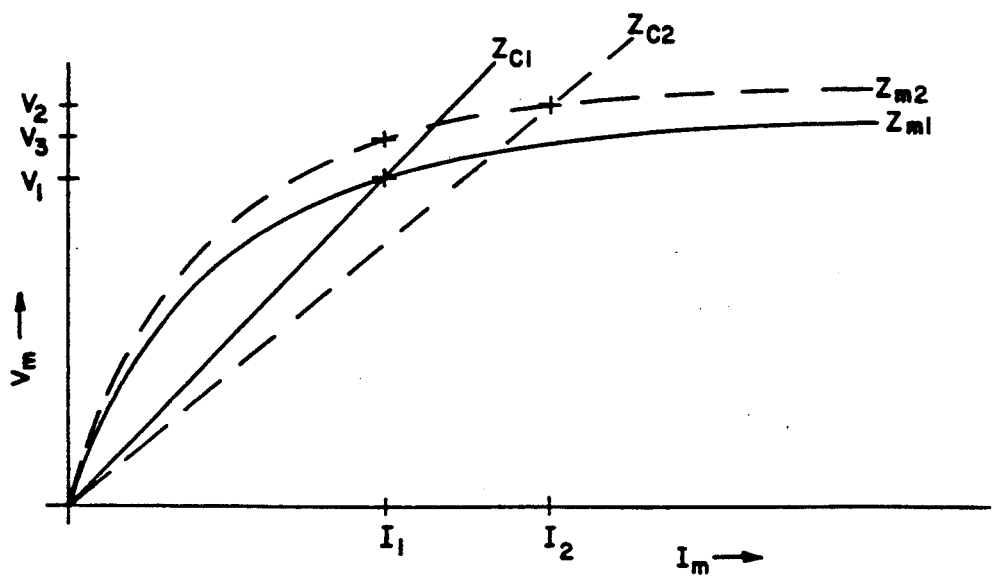
Fig. 4.

| Frequency (H$_z$) | V$_m$ | $\frac{C_B}{C}$ | $\frac{C_A}{C}$ | I$_2$ | X$_{V_L}$ |
|---|---|---|---|---|---|
| 30 | V$_1$ | 1 | 0 | I$_1$ | — |
| 35 | 1.17V$_1$ | .73 | .27 | 1.36 I$_1$ | .01469 $\frac{V_1}{I_1}$ |
| 40 | 1.33V$_1$ | .56 | .44 | 1.78 I$_1$ | .00682 $\frac{V_1}{I_1}$ |
| 45 | 1.50V$_1$ | .44 | .56 | 2.25 I$_1$ | .00424 $\frac{V_1}{I_1}$ |
| 50 | 1.67V$_1$ | .36 | .64 | 2.78 I$_1$ | .00298 $\frac{V_1}{I_1}$ |
| 55 | 1.83V$_1$ | .30 | .70 | 3.36 I$_1$ | .00225 $\frac{V_1}{I_1}$ |
| 60 | 2.00 V$_1$ | .25 | .75 | 4.00 I$_1$ | .00177 $\frac{V_1}{I_1}$ |

CAPACITOR-ASSISTED LINE COMMUTATION FOR INDUCTION MOTOR DRIVES

BACKGROUND OF THE INVENTION

A large number of industrial applications for rotating electrical machinery call for efficient variable speed motor drive systems of 100 horsepower or more. Such applications include motor drives for large pumps and high volume fans. Traditionally, such applications use DC motor drives because of the variable speed motor requirement.

The fairly recent availability of reliable high-power solid-state electronic components has made feasible the construction of inverters for driving variable-voltage, variable-frequency AC motor drives. The development of competitively priced large AC motor drives has been hindered by the fact that the least expensive type of inverter, the line-commutated inverter, and the least expensive AC motor, the squirrel-cage induction motor, are functionally incompatible in terms of their reactive power requirements.

In AC circuits the current and voltage waveforms are not always in phase. The power factor of the circuit is the cosine of the phase angle between the voltage waveform and the current waveform. When the phase of the current lags or leads the voltage, the corresponding power factor is referred to as a lagging power factor or a leading power factor, respectively.

For high power inverter applications, the most suitable solid-state switching device is the thyristor, which becomes conductive when a low power level signal is supplied to its gate terminal, and remains in a conductive state until the current through the thyristor is reduced to a near-zero value. At this point, a reverse voltage polarity across the main terminals of the thyristor is required for a short time interval to prevent the device from reverting to a conducting state. The process of turning off the thyristor by supplying this reverse voltage polarity is commonly referred to as commutation of the inverter.

A forced-commutated inverter requires appropriately charged energy storage devices which can be discharged across the thyristor to turn it off. Forced-commutated inverters typically need extra components such as additional thyristors, diodes, capacitors and inductors to turn off the thyristor. The additional circuitry required by a forced-commutated inverter makes the cost of the inverter approximately twice that of a line-commutated inverter, which does not require additional circuitry for turning off the thyristors. In a line-commutated inverter a sinusoidal power supply provides the voltage source that forces the thyristors in the inverter off in a sequential manner.

AC induction motors typically operate at a lagging power factor, while the more expensive AC synchronous motors may operate at a leading power factor. Of the two types of inverters mentioned above, the line-commutated inverter typically supplies motor loads which operate at a leading power factor, and the forced-commutated inverter supplies motor loads which operate at a lagging power factor. It is therefore evident that the most desirable combination, namely that of a line-commutated inverter driving an AC induction motor, is not practical, particularly in applications which require the motor to operate at various speeds.

Thus, two AC motor-drive systems have been available for applications requiring a high power variable speed motor drive The first, which uses a synchronous motor with a line-commutated inverter, simply cannot compete with the cheaper DC motor drive systems. The second alternative, that of driving an induction motor with a forced-commutated inverter is also not cost-competitive with DC motor drives. In addition, the second alternative is difficult to implement in very large motor drives, due to the large currents which must be forced-commutated. Neither of the aforementioned AC motor-drive system has seen substantial success in competing with DC motors for use in applications requiring large, variable speed motor drives.

Examples of using an AC induction motor with a line-commutated inverter may be found in U.S. patent application Ser. No. 331,108, entitled "Leading Power Factor Induction Motor Drive", filed Dec. 15, 1981 by Gabor Kalman and Graham W. McLean, and U.S. patent application Ser. No. 374,375, entitled "Variable Speed Induction Motor Drive System" filed May 3, 1982 by Gabor Kalman. These applications, both of which are assigned to the assignee of the present invention, solve the fundamental incompatability between the line-commutated inverter and the induction motor by providing an auxiliary rotor to supply the reactive power requirements of the main machine. While such applications work quite well with small machines, it is desirable to have a variable speed induction motor drive system which is capable of operating with large induction motors of a standard configuration, that is, motors not including the auxiliary machine.

SUMMARY OF THE INVENTION

The present invention utilizes a two-stage approach to allow variable-speed operation of an induction motor driven by a line-commutated inverter. The first stage involves installing power factor correction capacitors in parallel with the static inverter. The size of the capacitors installed are established by the reactive power requirements of the induction motor at the low end of the induction motor's variable speed range.

The second stage of the invention involves adjusting the firing angle of the line-commutated inverter simultaneously as the voltage and frequency are increased to cause the speed of the induction motor to increase. By a such a two-stage approach, a line-commutated inverter combined with power factor correction capacitors is used to drive an AC induction motor in a variable speed application.

The drive system of the present invention presents a significant cost advantage over the alternative AC motor drive systems discussed above. By using capacitor-assisted line-commutation, the cost of a drive system for an induction motor is reduced by approximately 50%. When the application is for driving a large induction motor, it can thus be seen that the cost saving is substantial. Likewise, the present invention offers substantial cost advantages over the use of a synchronous motor driven by a line-commutated inverter.

The present invention is capable of driving an induction motor over a speed range of approximately 2 to 1. An alternative embodiment of the present invention involves the use of a switchable bank of capacitors instead of the single value fixed power factor correction capacitors to provide a number of speed ranges for operation of the induction motor. For example, in a system having two speed ranges, two banks of capacitors would be used. In the lower speed range, both banks of capacitors would be connected in parallel with the inverter. For the high speed range, only one bank of capacitors would be connected. The advantage of having more than a single speed range is that the current through the thyristors at higher speeds is limited by switching some of the capacitors out of the circuit in the higher speed range, thus preventing overcurrent conditions in the thyristors or the requirement of larger, more expensive thyristors.

Thus, the present invention brings to economic reality the use of a variable speed AC motor drive system. The drive system of the present invention may be used with stock high power induction motors to provide a high power variable speed drive system. As such, an AC induction motor drive system now presents a feasible alternative to the use of the traditional DC motor drive system in high power variable speed applications.

DESCRIPTION OF THE DRAWINGS

These and other advantages of the present invention are best illustrated through reference to the drawings, in which:

FIG. 1 shows an equivalent circuit for an AC induction motor;

FIG. 2 shows the equivalent circuit of FIG. 1 simplified by disregarding copper, iron, and stator leakage losses;

FIG. 3 shows the simplified equivalent circuit of FIG. 2 under no-load conditions, in parallel with a power factor correction capacitor;

FIG. 4 shows plots of the impedance of an induction motor and the power factor correction capacitor of FIG. 3 for two different frequencies;

DETAILED DESCRIPTION OF THE PREFERRED EMBODIMENT

Figures 5, 6:
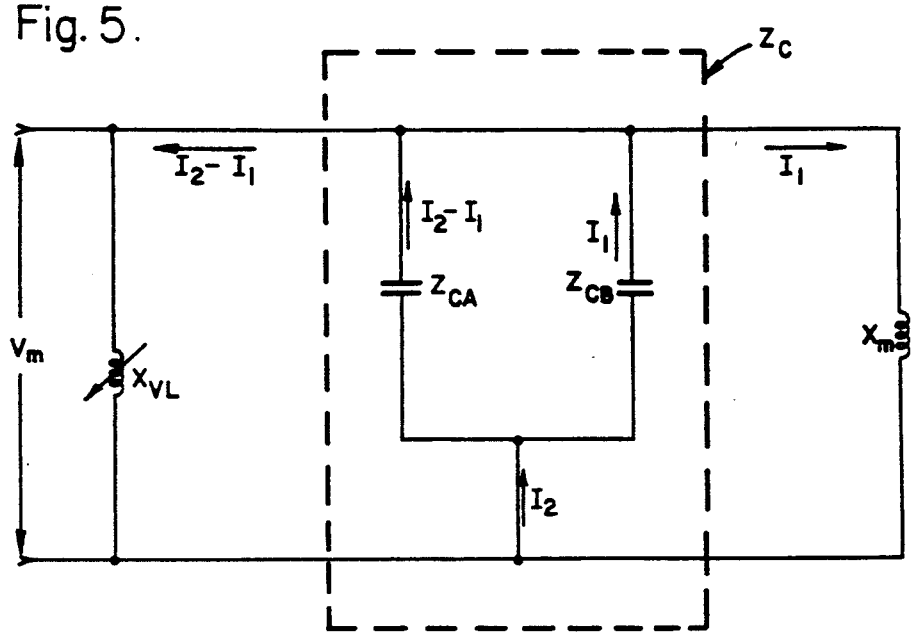
FIG. 5 shows an equivalent view of the induction motor and power factor correction capacitor of FIG. 3 which is connected in parallel with a variable inductance representing changes in the firing angle of the line-commutated inverter.
FIG. 6 is a chart showing values for the components of the circuit of FIG. 5 for various frequencies.

Referring to FIG. 1, an equivalent circuit for an AC induction motor is illustrated, which has at its terminals an impedance $Z_m$. $R_1$ represents copper losses in the stator, $X_1$ represents stator leakage, $X_m$ represents magnetizing reactance, $X_2$ represents leakage reactance, $R_2$ represents iron losses, $S_2$ represents rotor leakage reactance, and $R_3/s$ represents power absorbed from the stator to the rotor, where s is slip. Since $R_1$, $X_1$, and $X_2$ are relatively minimal when compared to $X_m$ and $R_3/s$, and $R_2$ is relatively large with respect to $X_m$, the equivalent circuit of FIG. 1 can be reduced to the circuit of FIG. 2. Since the equivalent circuit of FIG. 2 must be true for all operating conditions, and since the predominate concern is with reactive power rather than real power, it may be assumed for the moment that the induction motor is operating with no load, that is s is equal to 0. Therefore, $R_3/s$ will approach an open circuit, and the induction motor may be represented by the single inductance $X_m$, as shown in FIG. 3.

Since the induction motor represented by the inductance $X_m$ requires reactive power, under the first stage of the invention a power factor correction capacitor $Z_c$ is connected in parallel with the induction motor, as shown in FIG. 3. A magnetizing voltage $V_m$ appears across the capacitor $Z_c$ and the magnetizing reactance $X_m$, and a magnetizing current $I_m$ flows in the circuit through the power factor correction capacitor $Z_c$ and the magnetizing reactance $X_m$.

FIG. 4 shows plots of voltage versus current, or impedance, of the power factor correction capacitor $Z_c$ and the magnetizing impedance $Z_m$ (which is equivalent to $X_m$ for the no-load condition assumed above). At a first frequency, the plots are represented by solid lines intersecting at voltage $V_1$ and current $I_1$, and at a second higher frequency the impedance plots, shown by dashed lines, intersect at a second voltage $V_2$ and a second current $I_2$. The intersection of the impedance plots for the capacitor and the inductor represent the operating point of the system shown in FIG. 3 for that particular frequency.

It can be seen from the plots of FIG. 4 that if a single value power factor correction capacitor is used as in the circuits shown in FIG. 3, when the operating frequency (the motor speed) is increased the magnetizing current required increases substantially. This is further evident when it is considered that in order to achieve the desired performance of the induction motor represented by the magnetizing reactance $X_m$, the ratio of $V_m$ to operating frequency (Volts/Hz) must remain constant. Therefore, for the small increase of voltage between $V_2$ and $V_1$ in FIG. 4, a rather large increase in magnetizing current from $I_1$ to $I_2$ must occur with the fixed value power factor correction capacitor.

It is also desirable that the induction motor continues to operate at the lower magnetizing current $I_1$ while at the higher frequency represented by the curve $Z_{m2}$, and at the voltage $V_3$. In order to achieve this operating point, the capacitive reactance $Z_c$ (which decreases with increasing frequency) seen by the magnetizing reactance $X_m$ (which increases with increasing frequency) on the induction motor must be increased. This is the fundamental concept behind the second stage of the present invention. As the operating frequency of the induction motor increases, the amount of capacitive reactance $Z_c$ shown in FIG. 3 must be increased.

One possible method of doing this would be to disconnect a certain portion of a capacitor bank as the operating frequency of the induction motor increases. Such an approach, while effective, is not practical since a large number of switching operations would have to occur in a relatively small, for example 2 to 1, speed range.

It is therefore the approach of the present invention that the power factor correction capacitor remain constant for a speed range of 2 to 1. In order to accomplish this, a variable inductance $X_{VL}$ may be installed in parallel with power factor correction $Z_c$, as illustrated in FIG. 5. The equivalent of power factor correction capacitor $Z_c$ is shown in FIG. 5 as two parallel capacitors $Z_{CA}$ and $Z_{CB}$ in order to make the desired illustration. The capacitive reactance $Z_{CB}$ is the portion of the total capacitive reactance $Z_c$ seen by the magnetizing inductance $X_m$ representing the induction motor, and the capacitive reactance $Z_{CA}$ is that portion of the total capacitance $Z_c$ which must be neutralized by the variable inductance $X_{VL}$ in order to operate the system at the desired frequency.

For the circuit in FIG. 5, the total current flowing through the capacitor $Z_c$ is current $I_2$. The current flowing through the magnetizing reactance $X_m$ is $I_1$, and must remain constant as frequency and motor speed change, as described above in reference to FIG. 4. The current flowing through the variable inductance $X_{VL}$ is $I_2-I_1$.

By referring to FIG. 6 in conjunction with FIG. 5, a system is illustrated with a frequency range of 30 Hz to 60 Hz. Since the ratio of magnetizing voltage $V_m$ to the operating frequency will remain constant, it may be seen by referring to FIG. 6 that the magnetizing voltage $V_m$ varies linearly from $V_1$ at 30 Hz to 2.00 $V_1$ at 60 Hz. For purposes of the example shown in the chart of FIG. 6, the impedance $Z_c$ is assumed to be a total capacitance C, and the partial impedances $Z_{CA}$ and $Z_{CB}$ are assumed to be portions of the total capacitance CA and $C_B$ respectively. At 30 Hz operation, the magnetizing voltage is assumed to be $V_1$, and the current flowing through the total capacitive impedance $Z_c$, namely $I_2$, is equal to $I_1$, the magnetizing current. Since $I_2$ is equal to $I_1$ at 30 Hz, it may be seen that there is no current flowing through $Z_{CA}$ or $X_{VL}$. Since all of the capacitive inductance $Z_c$ is seen by the induction motor represented by the magnetizing reactance $X_m$, $C_B$ over C is equal to 1 and $C_A$ is equal to 0.

As the frequency increases, the voltage $V_m$ increases proportionately and the current $I_2$ through the capacitive impedance $Z_c$ increases as the square of frequency. With the value of the current $I_2$ known, and since magnetizing current $I_1$ must remain constant, the portion of the current flowing through $Z_{CA}$ must increase. Therefore, it can be seen that as frequency increases, the portion of the capacitance $C_B$ which is seen by the magnetizing reactance $X_m$ representing the inductance of the motor decreases, and the portion of the capacitor $C_A$ which must be neutralized by the variable inductance at $X_{VL}$ increases. Since the only variable component in the circuit of FIG. 5 is the variable inductance, it is the only component which must be changed as frequency changes in order for the induction motor, represented by the magnetizing reactant $X_m$, to operate over the frequency range shown by the chart in FIG. 6. Providing the variable inductance $X_{VL}$ is the basis of the second stage of present invention, which when combined with the power factor correction capacitor allows an induction motor to be driven by a line-commutated inverter.

Figure 7:
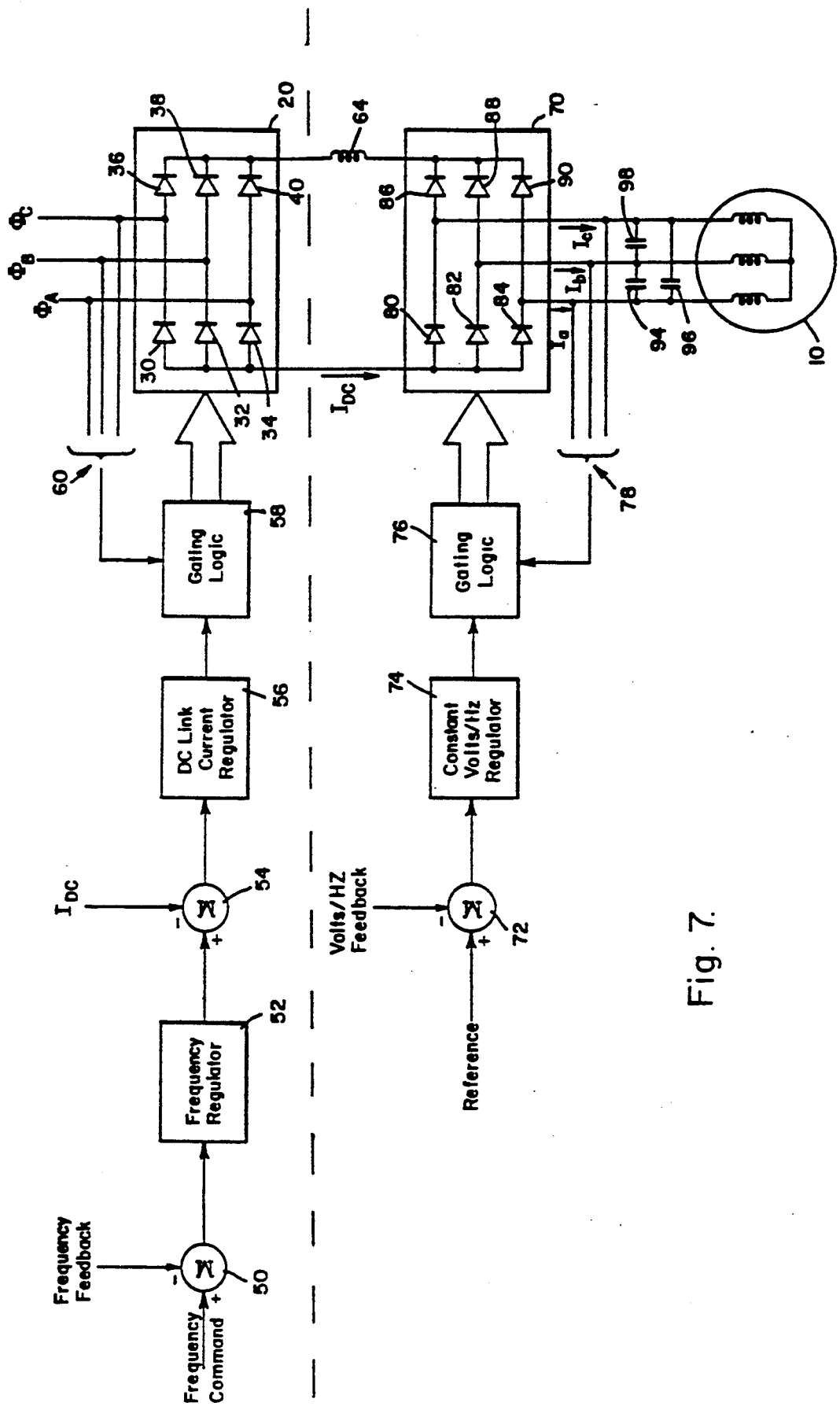
FIG. 7 is a schematic drawing of the capacitor-assisted line-commutated AC induction motor drive system comprising the present invention.

FIG. 7 shows the schematic for an induction motor drive designed to provide the variable inductance $X_{VL}$ as function of the firing angle of the line-commutated inverter. The circuitry shown in FIG. 7 is used to drive a high power three phase induction motor 10. The induction motor 10 includes a rotor (not shown) and a stator (represented by the inductors) mounted in a machine housing. The portion of the circuitry shown above the dashed line in FIG. 7 supplies the real power requirements of the induction motor 10, while the circuitry below the dashed line "supplies" the reactive power requirements of the induction motor 10.

Three phase power is supplied to a phase delay rectifier 20, of standard design in the art and containing thyristors 30, 32, 34, 36, 38, and 40. A frequency command signal and a frequency feedback signal are summed in a summer 50, the output of which is supplied to a frequency regulator 52, which is basically an amplifier with a built-in limited slew rate. The signal from the frequency regulator is then summed with a signal representing the link current $I_{DC}$ supplied by the phase delay rectifier 20 in a summer 54, the output of which is then supplied to a DC link current regulator 56.

The DC link current regulator 56 then supplies a signal to gating logic 58, which also receives a signal 60 indicating the phase of the three phase current input to the phase delay rectifier 20. The gating logic 58 controls the firing of the thyristors 30, 32, 34, 36, 38, and 40 in the phase delay rectifier, and therefore controls the amount link current $I_{DC}$ supplied by the phase delay-rectifier 20. The phase delay rectifier 20 thus supplies the real power requirements of the induction motor 10 by producing a varying link current $I_{DC}$, which is supplied through an inductor 64 to a line-commutated inverter 70.

The control system for the line-commutated inverter 70 is shown schematically and includes a reference signal which is summed with a signal indicating Volts/Hz feedback in a summer 72, the signal from which is supplied to constant Volts/Hz regulator 74, which in turn provides a signal to gating logic 76.

The gating logic 76 also receives a phase-indicating input 78 from the lines between the line-commutated inverter 70 and the induction motor 10. In response to these inputs, the gating logic 76 controls thyristors 80, 82, 84, 86, 88, and 90 in the line-commutated inverter 70.

Three power factor correction capacitors 94, 96, and 98 are connected in a delta fashion to the lines between the line-commutated inverter 70 and the induction motor 10. The capacitors 94, 96, and 98 are sized to provide exactly the amount of reactive power required by the induction motor 10 at its lowest operating frequency. For example, for an induction motor operating over a 30 Hz to 60 Hz speed range, the capacitors 94, 96, and 98 would be sized to provide the amount of reactive power needed by the motor 10 at the 30 Hz frequency. It should be noted that the capacitors could also be connected in a Wye fashion, as well as the illustrated delta connection.

Figure 8:
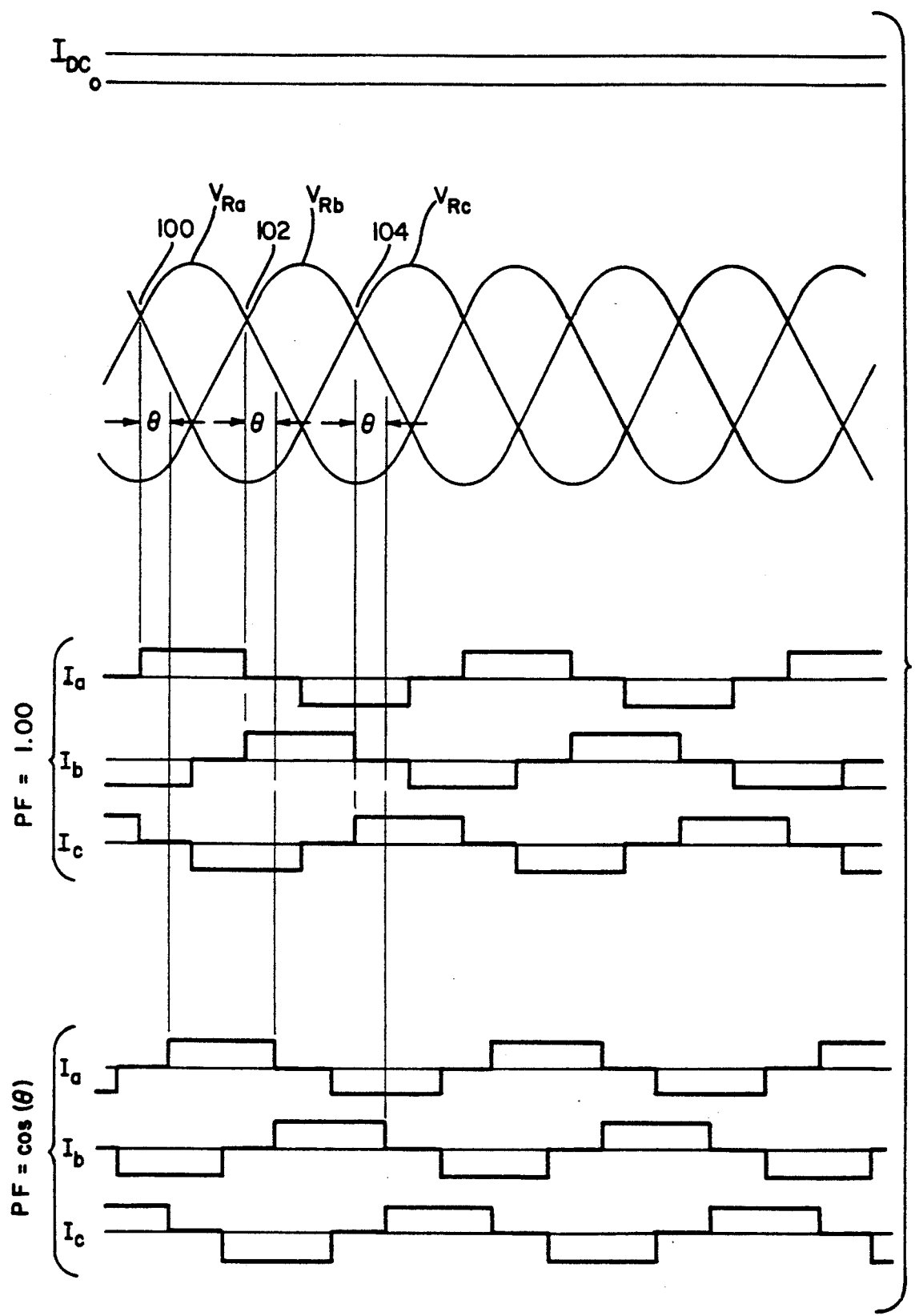
FIG. 8 is a drawing illustrating values of various parameters of operation of the system shown in FIG. 7 for operation with a unity power factor, and for a delayed firing angle allowing the line-commutated inverter to "absorb" a portion of the reactive power supplied by the power factor correction capacitor.

Referring now to FIG. 8 in addition to FIG. 7, the operation of the invention will be described in a simplified fashion. The top plot in FIG. 8 is the DC link current $I_{DC}$, which is controlled by the phased delay rectifier 20 and the portions of the control system above the dashed line in FIG. 7. The magnitude of the DC link current $I_{DC}$ varies in response to the real power demand of the induction motor 10. The sinusoidal plots in FIG. 8 represent the reactive voltages seen across the lines between the line-commutated inverter 70 and the induction motor 10. The intersections of these sinusoidal waves are used as reference points 100, 102, and 104 for controlling the thyristors 80, 82, 84, 86, 88, and 90 in the line-commutated inverter 70.

The rectangular waves labeled PF=1.00 ideally represent the currents $I_a$, $I_b$, and $I_c$ in the lines between the line-commutated inverter 70 and the induction motor 10, at the lowest operating frequency in the operating range, where the power factor is unity. This will correspond to 30 Hz in the chart of FIG. 6. As the operating frequency and magnetizing voltage $V_m$ increase proportionately, the capacitors 94, 96, and 98 begin to supply an excess amount of reactive power. This reactive power must be absorbed by the variable inductance $X_{VL}$, which was shown and described in conjunction with FIG. 5.

It has been discovered by varying the firing angle of the line-commutated inverter 70 as shown in the rectangular waves labeled PF=cosine(θ) in FIG. 8, the line-commutated inverter 70 will "absorb" a certain proportion of the reactive power supplied by the capacitors 94, 96 and 98. The firing angle is shown delayed by a phase angle θ in FIG. 8, which allows the line-commutated inverter 70 to absorb the excess reactive power supplied by the capacitors 94, 96, and 98. By doing so, the line-commutated inverter 70 acts as the variable inductor $X_{VL}$ of FIG. 5.

It will be recognized that the rectangular waves supplied as $I_a$, $I_b$, and $I_c$ are of a magnitude equivalent to that of the DC link current $I_{DC}$. Therefore, the real power requirement of the induction motor 10 is supplied by varying the DC link current $I_{DC}$, and the reactive power requirement of the induction motor is regulated by varying the firing angle as shown and described above with reference to FIG. 8.

Therefore, it can be seen that an induction motor 10 may be driven by a line-commutated inverter 70 in an entirely satisfactory manner. Since such a combination is made possible by the present invention, the cost of manufacturing an AC motor drive system has been cut approximately in half. It will be appreciated that such a significant cost reduction makes the system contained in this specification quite desirable for application in high power variable speed drive applications.

In a secondary embodiment of the present invention, assume that it would be desirable to operate the induction motor 10 not only in the frequency range from 30 Hz to 60 Hz given in FIG. 6, but up to a frequency of 90 Hz. It will be appreciated as the frequency rises from 30 Hz to 60 Hz, the current $I_2$ increases by a factor of 4. Since most of this current must flow through the variable inductance $X_{VL}$ of FIG. 5 (the line-commutated inverter 70), it is evident that by increasing the operating frequency range to 90 Hz the maximum amount of $I_2$ would be 9.00 $I_1$, with 8.00 $I_1$ flowing through the line-commutated inverter 70. Since this would require a substantially higher thyristor rating, it is desirable to provide a second frequency range by switching out a portion of the capacitance C in the circuit.

Therefore, since at 60 Hz operating frequency $C_B/C$ equals 0.25, three-quarters of the capacitance may be switched out of the circuit to provide a second speed range between 60 Hz and 90 Hz. Therefore, when the operating frequency of the induction motor 10 reaches 60 Hz, three-quarters of the capacitance is switched out the circuit, and simultaneously the firing angle is returned to the unity power factor position. Then, as the operating frequency increases from 60 Hz to 90 Hz, the firing angle is adjusted as described above to further reduce the amount of reactive power supplied by the reduced capacitance.

It may therefore be appreciated that the present system is a substantial improvement over variable speed high power AC motor drives used in the past. The present system may be operated advantageously over a 2 to 1 speed range without having any portion of the power factor correction capacitors switched in or out of the circuit. The speed of the induction motor 10 is controlled by a single frequency command, with the operation of the system across the speed range occurring without additional inputs or manually operated controls. The system of the present invention therefore enables a line-commutated induction motor drive system which operates efficiently and effectively to be constructed at a substantially reduced cost as contrasted to preexisting AC motor drive systems. The system embodies the advantages of both induction motors and line-commutated inverters, and brings the high power variable speed drive AC motor to the forefront of the systems available for such applications.

What is claimed is:

1. A variable speed induction motor drive system, comprising:
   means for generating a variable DC power signal;
   a line-commutated inverter for supplying through output terminals a variable voltage, variable frequency drive signal to an induction motor, said line-commutated inverter being operably connected to and supplied by said generating means;
   power factor connection means connected across said output terminals and said variable voltage, variable frequency drive signal; and
   means for varying the firing angle of said line-commutated inverter to thereby control the power factor of said variable voltage, variable frequency drive signal and cause said line-commutated inverter to compensate for excess reactive power supplied by said capacitors at higher frequencies.

2. A variable speed induction motor drive system as defined in claim 1, wherein said generating means comprises:
   a rectifier for converting an AC input to a pulsed DC output;
   an inductor for smoothing said pulsed DC output to a substantially flat DC output; and
   means for operating said rectifier to vary the magnitude of said pulsed DC output.

3. A variable speed induction motor drive system as defined in claim 2, wherein said rectifier comprises:
   a plurality of thyristers.

4. A variable speed induction motor drive system as defined in claim 1, wherein said line-commutated inverter comprises:
   a plurality of thyristers.

5. A variable speed inductor motor drive system as defined in claim 1, wherein said drive signal and said induction motor are three phase, said line-commutated inverter has three output terminals, and said power factor correction capacitors include:
   three capacitors wired in delta fashion across the three output terminals of said line-commutated inverter providing said drive signal to said induction motor.

6. A variable speed induction motor drive system as defined in claim 1, wherein said drive signal and said induction motor are three phase, said line-commutated inverter has three output terminals, and said power factor correction capacitors include:
   three capacitors wired in wye fashion across the three output terminals of said line commutated inverter providing said drive signal to said induction motor.

7. A variable speed induction motor drive system as defined in claim 1, further comprising:
   supplemental power factor correction capacitors selectively, switchably connected across said variable voltage, variable frequency drive signal, said induction motor operating in a low speed range and in a high speed range, said supplemental power factor correction capacitors being switchably connected across said drive signal only when said induction motor is operating in said low speed range.

8. A variable speed induction motor drive system as defined in claim 1, wherein said varying means is responsive to a feedback signal from said variable voltage, variable frequency drive signal.

9. A variable speed induction motor drive system as defined in claim 1, wherein said varying means delays the firing angle of said line-commutated inverter to change the effective power factor of said line-commutated inverter in response to a change in the speed of said induction motor.

10. A variable speed induction motor drive system as defined in claim 9, wherein an increasing amount of reactive power generated by said power factor correction capacitors as said speed of said induction motor increases is compensated for by said line-commutated inverter by said change in the effective power factor of said line-commutated inverter.

11. A variable speed induction motor drive system as defined in claim 1, wherein the ratio of voltage to frequency of said variable voltage, variable frequency drive signal remains essentially constant through the operating range of said induction motor.

12. A variable speed AC induction motor drive system, comprising:
- rectifier means for generating a variable DC power signal from an AC line;
- a line-commutated inverter having as an input said variable DC power signal, said line-commutated inverter supplying as an output a variable voltage, variable frequency drive signal for connection to the inputs of an AC induction motor as the power supply for said AC induction motor;
- power factor correction capacitors also for connection to said inputs of said AC induction motor, said power factor correction capacitors allowing said AC induction motor to be driven at a first speed by said line-commutated inverter when said line-commutated inverter is operating at a first power factor;
- control means for varying the power factor at which said line-commutated inverter operates by changing the firing angle of said line-commutated inverter to cause said line-commutated inverter to compensate for excess reactive power supplied by said capacitors at higher frequencies.

13. A variable speed AC induction motor drive system as defined in claim 12, wherein said firing angle of said line-commutated inverter is delayed to cause said line-commutated inverter to operate at a second power factor smaller than said first power factor when said AC induction motor is to be driven at a second speed greater than said first speed.

14. A variable speed AC induction motor drive system as defined in claim 12, wherein said rectifier means is a phase delay rectifier.

15. A variable speed induction motor drive system, comprising:
- means for supplying a variable DC power output;
- a line-commutated inverter connected to said variable DC power output for outputting a variable voltage, variable frequency drive signal to a set of drive terminals on an induction motor;
- power factor correction capacitors connected to said set of drive terminals for allowing said induction motor to be driven by said line-commutated inverter; and
- means for compensating for increased reactive power developed by said capacitors at higher frequencies of said drive signal by controlling the firing angle of the line-commutated inverter to increase the power factor of the load at said drive terminals.

16. A variable speed induction motor drive system as defined in claim 15, wherein said variable voltage, variable frequency drive signal from said line-commutated inverter has a constant voltage to frequency ratio.

17. An induction motor drive system, comprising:
- a machine housing;
- a stator assembly fixedly mounted within said machine housing;
- a rotor assembly rotatably mounted within said machine housing;
- a line-commutated inverter connected to said stator assembly for supplying an electric drive signal to said stator assembly;
- power factor correction capacitors connected to said stator assembly; and
- means for changing the effective power factor of said line-commutated inverter by varying the firing angle of said line-commutated inverter as a function of the speed of said induction motor in order to compensate for increased reactive power developed by said capacitors at higher motor speeds.

18. An induction motor drive system, comprising:
- a housing;
- a stator assembly fixedly mounted in said housing;
- a rotor assembly rotatably mounted in said housing;
- rectifier means for providing an electrical current;
- line-commutated inverter means supplied with electric current by said rectifier means, said inverter means being connected to provide a variable voltage, variable frequency drive signal to said stator assembly;
- power factor correction means including at least one capacitor connected in circuit with said inverter means and said stator assembly; and
- means for varying the firing angle of said inverter means, thereby modifying the power factor of said at least one capacitor electrically connected to said inverter means and said stator assembly to cause said inverter to compensate for excess reactive power at higher frequencies.

19. A method of driving an induction motor, comprising:
- generating a variable DC power signal;
- supplying a line-commutated inverter with said variable DC power signal;
- providing a variable voltage, variable frequency drive signal from said line-commutated inverter to an induction motor;
- establishing a low-speed operating point for said induction motor by installing power factor correction capacitors across said variable frequency drive signal; and
- varying the firing angle of said line-commutated inverter to control the power factor of said variable voltage, variable frequency drive signal as the operating speed of said induction motor increases by compensating for excess reactive power supplied by said capacitors at higher frequencies.

20. A method as defined in claim 19, wherein said generating step comprises:
- using a phase delay rectifier to obtain a first DC signal; and
- utilizing an inductor between said rectifier and said line-commutated inverter to smooth said first DC signal into said variable DC power signal.

21. A method as defined in claim 19, wherein said varying step comprises:
changing the firing angle of thyristors contained in said line-commutated inverter.

22. A method of driving an induction motor over a variable speed range of from 1 to at least 1.5 times a base speed, comprising:
supplying a varying voltage, variable frequency drive signal from a line-commutated inverter to an induction motor;
connecting power factor correction capacitors to said induction motor suitable to correct the power factor of the motor circuit at speeds in the lower portion of said range; and
compensating for increased reactive power developed by said capacitors at motor speeds in the upper portion of said range by varying the firing angle of said inverter to change the power factor of said variable voltage, variable frequency drive signal.

* * * * *

UNITED STATES PATENT AND TRADEMARK OFFICE
CERTIFICATE OF CORRECTION

PATENT NO. : 5,239,250

DATED : Aug. 24, 1993

INVENTOR(S) : Gabor Kalman and Colin E. Huggett

It is certified that error appears in the above-identified patent and that said Letters Patent is hereby corrected as shown below:

Column 8, line 16, delete "connection means" and substitute --correction capacitors--.

Signed and Sealed this

Twenty-ninth Day of March, 1994

Attest:

BRUCE LEHMAN

*Attesting Officer*     *Commissioner of Patents and Trademarks*